United States Patent [19]

Mouché et al.

[11] Patent Number: 4,802,994
[45] Date of Patent: Feb. 7, 1989

[54] BIOCIDE TREATMENT TO CONTROL SULFATE-REDUCING BACTERIA IN INDUSTRIAL PROCESS WASTE WATERS

[75] Inventors: Richard J. Mouché, Batavia; Mei-Jan L. Lin, Naperville, both of Ill.

[73] Assignee: Nalco Chemical Company, Naperville, Ill.

[21] Appl. No.: 88,011

[22] Filed: Aug. 18, 1987

Related U.S. Application Data

[63] Continuation of Ser. No. 886,480, Jul. 17, 1986, abandoned.

[51] Int. Cl.⁴ ............................................. C02F 1/72
[52] U.S. Cl. ................................. 210/759; 210/764; 424/130; 422/36
[58] Field of Search ............... 210/759, 764; 424/130; 422/28, 36

[56] References Cited

U.S. PATENT DOCUMENTS

| | | | |
|---|---|---|---|
| 2,801,216 | 7/1957 | Yoder | 252/8.554 |
| 2,917,428 | 12/1959 | Hitzman | 210/764 |
| 3,167,471 | 1/1965 | Kovacs | 424/130 |
| 4,129,517 | 12/1978 | Eggensperger | 424/130 |
| 4,311,598 | 1/1982 | Verachtert | 210/759 |
| 4,495,200 | 1/1985 | Lindstrom et al. | 210/764 |
| 4,496,534 | 1/1985 | Delaney et al. | 210/764 |
| 4,532,117 | 7/1985 | Delaney et al. | 210/764 |

FOREIGN PATENT DOCUMENTS 2815400 10/1979 Fed. Rep. of Germany ...... 424/130

Primary Examiner—Peter Hruskoci
Assistant Examiner—Coreen Y. Lee
Attorney, Agent, or Firm—John G. Premo; Anthony L. Cupoli; Donald G. Epple

[57] ABSTRACT

Sulfate-reducing bacteria present in industrial waste waters can be controlled by using hydrogen peroxide in combination with non-oxidizing organic biocides known to be effective against sulfate-reducing bacteria.

4 Claims, No Drawings

BIOCIDE TREATMENT TO CONTROL SULFATE-REDUCING BACTERIA IN INDUSTRIAL PROCESS WASTE WATERS

This is a continuation of co-pending application Ser. No. 886,480 filed on 7-17-86, now abandoned.

INTRODUCTION

Certain industrial process waters become highly contaminated with sulfate-reducing bacteria, particularly the species *Desulfovibrio desulfricans*. A good example of such industrial process water contamination is found in the sludges and slurries produced as a result of flue gas desulfurization scrubbers. Such sludges or slurries are produced due to scrubbing gases in the stacks of large boilers such as are found in utilities. These large boilers utilize high sulfur fuels such as coal or high sulfur fuel and residual oils.

A common method of controlling sulfate-reducing bacteria is the use of non-oxidizing biocides. These materials are well-known and are illustrated by such well-known materials as methylene bis thiocyanate, metronidazole, and blends of certain dithiocarbamates.

It has been found, however, that when these industrial waters contain sulfate-reducing bacteria in quantities greater than 10 colonies per ml that these sulfate-reducing bacteria controlling biocides are ineffective or require such large dosages as to be impractical.

In a similar fashion, oxidizing biocides such as hydrogen peroxide and chlorine, either as $Cl_2$ gas or as bleach, are relatively ineffective when treating waters highly contaminated with large amounts of sulfate-reducing bacteria.

If it were possible to provide a good, economical, low dosage treatment for solving the above described problem, an advance in the art would be afforded.

THE INVENTION

The invention is a method of controlling sulfate-reducing bacteria present in industrial waste waters and sludges which have a sulfate-reducing bacteria population greater than 10 colonies per ml. The method comprises treating such waters with a biocidal composition comprising:

A. Hydrogen peroxide; and,
B. A non-oxidizing organic biocide known to be effective against sulfate-reducing bacteria.

with the dosage of A being at least 1,000 ppm by weight and the dosage of B being within the range of between about 5–500 ppm by weight.

Hydrogen Peroxide

This well-known biocide is commercially available and is inexpensive. It is used at a concentration of at least 1,000 ppm with dosages as high as 5,000 ppm being contemplated. Typically, 1,500–3,000 ppm of the hydrogen peroxide would be used. It is conveniently applied in the form of a 30% solution in water.

The Non-Oxidizing Organic Biocides Known to be Effective Against Sulfate-Reducing Bacteria The literature is replete with references to biocides that are effective in controlling sulfate-reducing bacteria. Typical and illustrative, but non-inclusive of such materials, are the following biocides:

| | |
|---|---|
| Composition No. 1 | 20% 2,2,Dibromo-3-nitrilopropionamide |
| Composition No. 2 | 1.15% 5-chloro-2-methyl-4-isothiazolin-3-one 0.35% 2-methyl-4-isothiazolin-3-one |
| Composition No. 3 | 0.9% metronidazole |
| Composition No. 4 | 15% Sodium dimethydithiocarbamate 15% Disodium ethylene bisdithiocarbamate |
| Composition No. 5 | 10% methylene bis thiocyanate |
| Composition No. 6 | 45% glutaraldehyde |
| Composition No. 7 | 78.5% hexahydro-1,3,5-tris(2-hydroxyethyl)-S—triazine |

The above compositions represent commercial products with the percentages showing the actual amount of the biocide present in the product.

Of the above biocides, preferred are Compositions No. 4 and 6 with Composition 4 being most preferred. These biocides may be used over a large dosage range depending upon the effectiveness of the biocides. Typical dosages vary between 5–500 ppm.

In addition to using the carbamates described in Composition No. 4, other biocidally effective thiocarbamates may be used.

When the combination of the hydrogen peroxide and the organic non-oxidizing biocide are fed together, it is preferred that they be slug fed. This high dosage should be maintained to produce sterilization at which time the peroxide can be discontinued and a lower dosage of the organic biocide can be used to maintain control.

The invention is particularly effective in controlling flue gas scrubber sludges or slurries when the concentration of the sulfate-reducing bacteria is about or greater than 100 colonies per ml.

The following is presented by way of example:

Test Conditions

Various biocides were incubated with the sludge for 24 hours. The sludge was then innoculated into test tubes containing tryptone-sodium-sulfite-ferric citrate agar medium. The tubes were incubated for 72 hours at 30° C., then the tubes were observed for dark spots, indicating colonies of sulfate-reducing bacteria.

Method

Sulfate-reducing bacteria have the capability of reducing inorganic sulfates to hydrogen sulfide. Hydrogen sulfide in aqueous solutions corrodes metal surfaces. Where a slime deposit on a metal surface is scraped away, localized pitting will be noted if sulfate reducers were incorporated in the slime.

Sulfate reducers are cultured by the use of a tryptone-sodium-sulfate-ferric citrate agar medium developed by Nalco. A deep tube technique is used to produce an anaerobic environment for the organism.

The agar medium is made up in the following way:
1. 1 liter of deionized water
2. 2 grams sodium sulfite
3. 20 grams Bacto-agar
4. 10 grams Bacto-Tryptone
5. Mix and autoclave for 10 minutes at 15 lbs. pressure at 121° C.
6. Add 10 cc of 5% ferric citrate solution

Test Results and Conclusions

Three series of tests were conducted. Preliminary results indicated that as high as 6,000 ppm of the nonoxidizing biocides—such as Compositions 2, 3, 4 and 5 had little or no effect at reducing the bacteria population in the sludge.

In the next series of testing, oxidizing biocides including hydrogen peroxide at 25,000 and 5,000 ppm active and bleach at 7,500 and 1,500 ppm in combination were tested by themselves and with Composition No. 3 and 4. Bleach or hydrogen peroxide at either of these two levels alone had almost no effect in killing the bacteria. Only hydrogen peroxide at 25,000 ppm over layed with 2,000 ppm of Composition No. 3 sterilized the sludge.

Bleach, at these dosages with 2,000 ppm of Composition No. 3 or 4, was not effective.

Since these levels of chemicals were very high, lower dosages were tried in the third series of testing. Effective reduction of sulfate reducers by orders of magnitude to almost complete sterilization was attained with 2,500 ppm active hydrogen peroxide plus 1,000 ppm Composition No. 4.

The combination of 2,500 ppm active hydrogen peroxide plus 1,000 ppm Composition No. 3 was also effective, but not as good as the Composition No. 4 combination.

Other combinations with higher levels of hydrogen peroxide and the same amount of Composition No. 3 and 4 were effective but the dosage of hydrogen peroxide should be minimized and slowly added to prevent excessive foaming due to the release of oxygen gas.

Finally, the maintenance dosage of 1 to 200 ppm of Composition No. 4 and No. 6 twice a week would keep the sulfate reducers under control (for bacteria population below 10 per ml of sludge), this was determined by earlier tests on a milder sludge. Testing for sulfate reducers, and adjusting the maintenance dosage and frequency is recommended until the system is optimized and stabilized.

Having thus described our invention, we claim:

1. A method of controlling sulfate-reducing bacteria in flue gas scrubber sludges or slurries produced from scrubbing gases in utilities, said sludges or slurries having a sulfate-reducing bacteria population greater than 10 colonies per ml which comprises treating said sludges or slurries with a biocidal composition comprising:

A. Hydrogen peroxide, and

B. A non-oxidizing organic biocide effective against sulfate-reducing bacteria selected from the group consisting of sodium dimethyldithiocarbamate/disodium ethylene bisdithiocarbamate in a 1:1 weight ratio, metronidazole and gluteraldehyde with the dosage of A being at least 1,000 ppm by weight of the sludges or slurries and the dosage of B being within the range of between about 5–500 ppm by weight of the sludges or slurries.

2. The method of claim 1 where the non-oxidizing organic biocide is a biocidally active sodium dimethyldithiocarbamate/disodium ethylene bisdithiocarbamate in a 1:1 weight ratio.

3. The method of claim 1 where the non-oxidizing organic biocide is glutaraldehyde.

4. The method of claim 1 wherein the dosage of "A" is within the range of 1500–3000 ppm.

* * * * *